United States Patent [19]

Finkelstein et al.

[11] 4,373,177
[45] Feb. 8, 1983

[54] HIGH TEMPERATURE ELECTROLYTIC CAPACITOR

[75] Inventors: Manuel Finkelstein, North Adams; Franz S. Dunkl; Sidney D. Ross, both of Williamstown, all of Mass.

[73] Assignee: Sprague Electric Company, North Adams, Mass.

[21] Appl. No.: 306,994

[22] Filed: Sep. 30, 1981

[51] Int. Cl.³ .............................................. H01G 9/02
[52] U.S. Cl. ................................. 361/433 A; 252/62.2
[58] Field of Search ........................ 252/62.2; 361/433

[56] References Cited

U.S. PATENT DOCUMENTS 3,293,506 12/1966 Chesnot ............................. 252/62.2
3,812,039 5/1974 Niwa et al. ......................... 252/62.2
3,835,055 9/1974 Chesnot .............................. 252/62.2

FOREIGN PATENT DOCUMENTS 839159 4/1970 Canada ..................................... 31/45
2011182 7/1979 United Kingdom ................ 252/62.2
303662 7/1971 U.S.S.R. .............................. 252/62.2

Primary Examiner—Jack Cooper

[57] ABSTRACT

A high-temperature aluminum electrolytic capacitor contains an electrolyte of mono(di-n-propylammonium) adipate or mono(diisopropylammonium) adipate, a phosphate salt, and water dissolved in ethylene glycol to provide a capacitor capable of operating at least at 200 VDC and 130° C.

4 Claims, 2 Drawing Figures

HIGH TEMPERATURE ELECTROLYTIC CAPACITOR

BACKGROUND OF THE INVENTION

This invention relates to an aluminum electrolytic capacitor capable of operation at 200 VDC or higher at an ambient temperature of 130° C. through the use of an electrolyte containing mono(di-n-propylammonium) adipate or mono(diisopropylammonium) adipate as solute, and a phosphate salt and water dissolved in ethylene glycol as solvent.

Heretofore, electrolytes for aluminum electrolytic capacitors operating at 200 V or higher most commonly contained salts of boric acid or boric acid derivatives as the solute in ethylene glycol as solvent. The maximum operating temperature for such an electrolyte system is less than 100° C. and normally 65°–85° C. The temperature limitation is due to the facile reaction of glycol with boric acid and other borate species to form polymeric glycol-borates and water. The minimum operating temperatures are above −20° C. inasmuch as glycol freezes at −17.4° C.

The effective temperature operating range of aluminum electrolytic capacitors has been expanded in both directions by replacing the glycol solvent with N,N-dimethylformamide (DMF) which has a boiling point of 153° C. and a freezing point of −61° C. There are known prior art DMF electrolytes that can be effectively used over the temperature range −55° C. to 125° C. However, DMF is a very aggressive solvent and attacks most materials of construction. The most resistant material for sealing gaskets and O-rings is Butyl rubber. Unfortunately, DMF will be transmitted through a Butyl rubber closure at a rate that increases with increasing temperature, thus limiting the life of the capacitor since the capacitors will not function adequately when approximately one-half the solvent has been lost.

DMF also has a flash point of 67° C. making it undesirable for use as solvent in capacitors that are to be used in confined spaces. In contrast, glycol has a boiling point of 197.2° C. and a flash point of 116° C. and is much easier to contain. Rates of transmission of glycol through both Butyl rubber and ethylene-propylene rubber (EPR) are almost negligible.

For current power supply operations, it is desirable to provide an aluminum electrolytic capacitor capable of operating continuously at 200 VDC or higher at an ambient temperature of 130° C. with modest low temperature properties.

It would be desirable to use ethylene glycol as solvent for the reasons given above. If glycol is used, then the solute can not be boric acid or a borate because of its reaction with glycol as described above. The solute should be one that will not react with glycol or any other cosolvent that might be used. The solute must also be stable at operating temperatures of 130° C., and at somewhat higher temperatures.

The major cause of resistivity increase in an electrolyte is amide formation, particularly where the solute is an ammonium or substituted ammonium salt of a dicarboxylic acid. For example, diammonium adipate, a known solute for electrolytic capacitor electrolytes, will rapidly form adipamide, a non-conducting species, at 125° C. when used in an ethylene glycol solvent. Since adipamide is insoluble in glycol, this reaction is readily detected. For other salts that undergo amide formation but form soluble amides, the reaction can be detected by increases in resistivity. Amide formation proceeds most readily with ammonium salts, and more readily with salts of primary amines than with salts of secondary amines. Amide formation is most difficult with salts of tertiary amines, as a carbon-nitrogen bond must be broken for it to proceed.

SUMMARY OF THE INVENTION

An aluminum electrolytic capacitor capable of continuous operation at 200 VDC or higher and 130° C. is provided by the use of an electrolyte system of mono(di-n-propylammonium) adipate or mono(diisopropylammonium) adipate as solute, a phosphate salt, and water dissolved in ethylene glycol as solvent.

DESCRIPTION OF THE PREFERRED EMBODIMENTS

Figure 1:
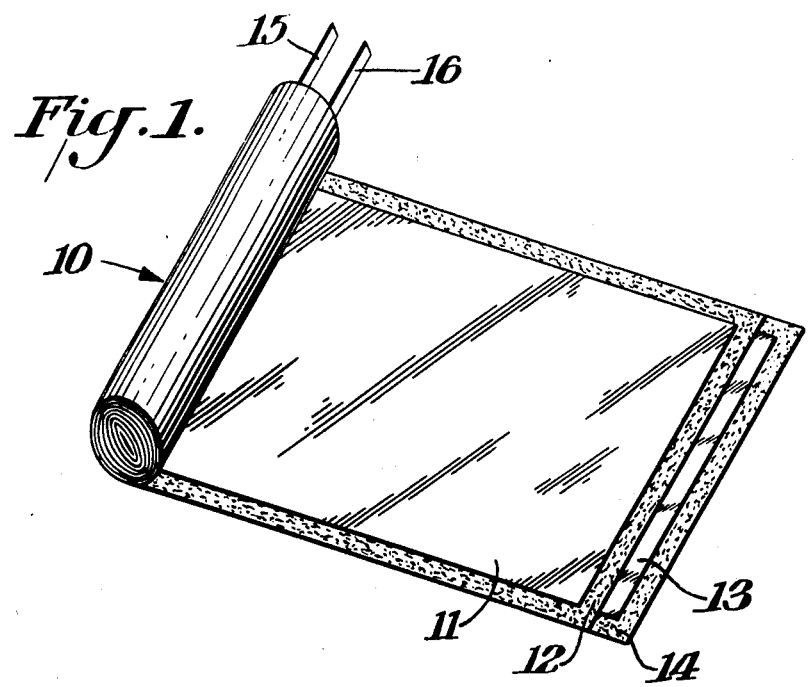
FIG. 1 shows a wound capacitor section partially unrolled.

Referring to FIG. 1, wound capacitor section 10 consists of anode foil 11 of aluminum having on its surface an insulating oxide barrier layer. Cathode foil 13 is also aluminum. Electrolyte absorbent layers 12 and 14, preferably paper, are positioned between the anode foil 11 and cathode foil 13 and interwound therewith. Tabs 15 and 16 are connected to electrodes 11 and 13, respectively, to provide for connection of the electrodes to leads. When completely wound, section 10 is impregnated with an electrolyte (not shown) of this invention.

Figure 2:
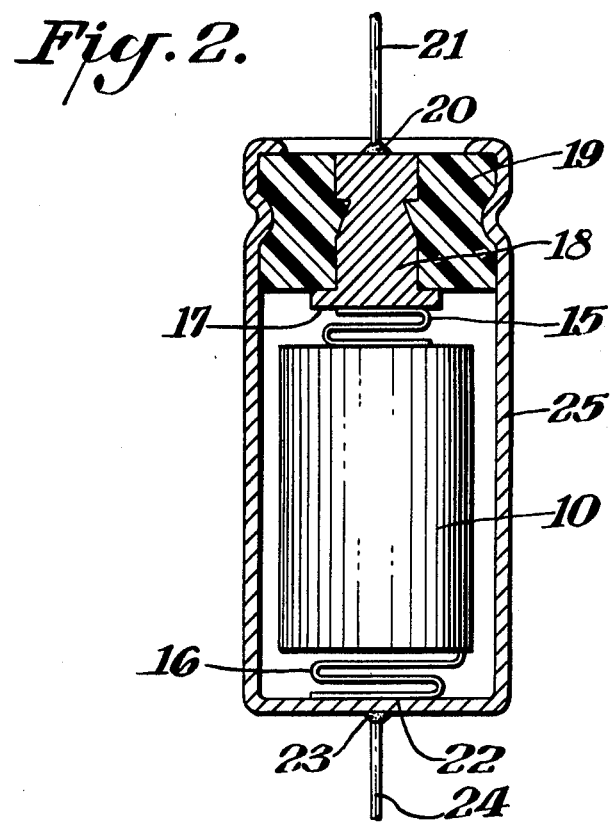
FIG. 2 is a cross-section of a capacitor containing a wound section.

FIG. 2 shows a cross-section of an axial capacitor in which the cathode tab 16 of capacitor section 10 is welded at 23 to cathode lead 24. Anode tab 15 is welded to portion 17 of insert 18 positioned in bushing 19 and welded at 20 to anode lead 21. Electrolyte (not shown) impregnates section 10.

The electrolyte is a solution in ethylene glycol of mono(di-n-propylammonium) adipate or mono(diisopropylammonium) adipate, a phosphate salt, and water.

As pointed out earlier, for operation at 130° C., the electrolyte must be stable at 130° C. and preferably stable at somewhat higher temperatures. For this reason, 150° C. was chosen for the stability screening test.

The desired room-temperature resistivity of the electrolyte depends on the voltage rating of the capacitor and the operating temperatures to which the capacitor will be subjected. For 200 VDC capacitors operating at 130° C., the room-temperature resistivity should be at least 700 Ω-cm and approximately 700–800 Ω-cm; preferably, this resistivity should increase to no more than 1200 Ω-cm after 1000 hr at 150° C. For higher voltage capacitors, electrolytes with higher resistivities should be employed, and for lower voltage capacitors, electrolytes with lower resistivities.

The electrolyte must have a maximum anodization voltage at least equal to the rated voltage of the capacitor at the operating temperature, i.e. at least 200 V at 130° C. for a 200 V capacitor, to be able to reform damaged barrier oxide layer on the anode foil during operation. For operating voltages of 200 V and higher, it has been found that a phosphate salt must be included in these electrolytes to insure continuous operation.

Thirteen different salts, ammonium or substituted-ammonium, were evaluated in a thermal stability screening test conducted at various temperatures ranging from 105° C. to 150° C. The test involves measuring the room-temperature resistivity of the electrolytes, sealing samples of the electrolytes in glass tubes, and heating the sealed tubes to the test temperature. At approximately 500 hr intervals, samples are withdrawn and cooled to room temperature; the resistivity is measured at room temperature. Of the 13 salts tested, 7 gave electrolytes that were satisfactory at 150° C. The seven satisfactory salts included bis(tert.butylammonium) adipate, a di-salt, two piperidinium salts that had fairly complicated syntheses, diethyl- and trimethylammonium salts that subsequently proved unsatisfactory at the desired voltages, and the di-n-propylammonium and diisopropylammonium salts of the present invention.

Since the monodipropyl and monodiisopropyl salts were easier to make than the piperidinium salts, these two were selected for further study.

EXAMPLE 1

Resistivity data, maximum formation voltages, and 150° C. stability data are presented below for mono(di-n-propylammonium) adipate and mono(diisopropylammonium) adipate in ethylene glycol-water mixtures. Resistivity is given in ohm-cm, and stability is measured by resistivity at 25° C. after heating at 150° C. for the indicated time.

Electrolyte A was prepared in-situ from 11.1 g of dipropylamine, 16.1 g of adipic acid, 68.9 g of ethylene glycol and 4.0 g of water and corresponds to a solution of mono(di-n-propylammonium) adipate in ethylene glycol-water.

Electrolyte B was also prepared in-situ from 8.1 g of diisopropylamine, 11.7 g of adipic acid, 76.2 g of ethylene glycol, and 4.0 g of water and corresponds to a solution of mono(diisopropylammonium) adipate in ethylene glycol-water.

TABLE 1

| Elec-trolyte | Resistivity at 25° C. | Resistivity at −20° C. | Resistivity at 150° C. | Max. formation Voltage at 25° C. | Max. formation Voltage at 150° C. | Stability at hours 500 | Stability at hours 1000 | Stability at hours 2000 |
|---|---|---|---|---|---|---|---|---|
| A | 728 | 9370 | 51.2 | 450 | 415 | 999 | 1097 | 1119 |
| B | 933 | 12790 | 67.7 | 460 | 430 | 969 | 969 | 957 |

Electrolyte B has the better stability characteristics, but its room-temperature resistivity of about 930 Ω-cm makes it more desirable for capacitors operating at higher than 200 VDC.

EXAMPLE 2

Twenty-five capacitors rated at 50 μF and 200 VDC were life-tested at 200 VDC and 130° C. Table 2 gives average results for these capacitors containing an electrolyte containing mono(di-n-propylammonium) adipate and made from 65.3 g of ethylene glycol, 18.8 g of adipic acid, 13.0 g of di-n-propylamine, 2.4 g of water, and 0.5 g of ammonium dihydrogen phosphate as phosphate ion source. The room-temperature resistivity of this electrolyte is about 785 ohm-cm. Capacitance is in microfarads, leakage current is microamperes, and weight loss, a measure of stability, in milligrams.

TABLE 2

| | 120 Hz | | Leakage Current | | |
|---|---|---|---|---|---|
| Hours | Capacitance | ESR | 2 min | 5 min | Wt. Loss |
| 0 | 55.2 | 0.85 | 5.86 | 3.39 | — |
| 424 | 54.3 | 0.67 | 2.52 | 1.29 | 25.3 |
| 1000 | 54.3 | 0.75 | 2.18 | 1.06 | 56.0 |
| 1430 | 53.9 | 0.73 | 3.00 | 1.30 | 77.5 |
| 1572 | 54.2 | 0.75 | 2.33 | 1.01 | 85.4 |
| 2000 | 54.1 | 0.75 | 2.39 | 1.08 | 107.2 |
| 2500 | 53.9 | 0.80 | 2.14 | 0.97 | 132.9 |
| 3000 | 53.5 | 0.80 | 2.46 | 1.17 | 155.7 |

The rate of weight loss is a useful predictor of the ultimate life of a capacitor. A rule-of-thumb is that when a capacitor loses 40–50% of its electrolyte, it starts to deteriorate electrically and becomes a risk. For example, for a capacitor containing 2000 mg of electrolyte, a weight loss rate of 100 mg/1000 hrs would predict the capacitor would lose 40–50% of its electrolyte, or 800–1000 mg, in 8000–10,000 hrs. At this point it would be predicted to start to deteriorate and go off-specification electrically. The capacitors shown above do contain 2000 mg of electrolyte, and, from the data above, a life of 15,000–20,000 hrs is predicted before reaching the 40–50% (or 800–1000 mg) wt loss. Since these values are for 130° C. operation, these are extremely stable capacitors.

EXAMPLE 3

In this example, the effect of a phosphate salt on electrolyte performance is shown. The electrolyte of Example 2 (electrolyte 1a) was used in capacitors rated at 50 μF-200 VDC which were aged at 275 V for 2.5 hrs at 105° C. and compared with the results for the same electrolyte without phosphate (electrolyte 1b).

A different formulation (electrolyte 2a) made from 44.5 g adipic acid, 30.8 g dipropylamine, 67 g of water, and 1000 ml of ethylene glycol with and without 3.8 g of ammonium dihydrogen phosphate was tested in 10 μF-450 V capacitors at 85° C. for 1 hr at 400 V, 1 hr at 450 V and 2 hr at 475 V. For these higher voltage capacitors, electrolytes with higher resistivities were needed; the version without phosphate (electrolyte 2b) had a room-temperature resistivity of about 1596 Ω-cm while that with phosphate (electrolyte 2a), about 1540 Ω-cm. Both had a maximum formation voltage of 490 V.

TABLE 3

| Electrolyte | No. shorts/No. capacitors | Leakage current, μA |
|---|---|---|
| 1a | 0/25 | 3.4 |
| 1b | 40/40 | — |
| 2a | 3/10 | 275.9 |
| 2b | 11/11 | — |

In both sets of capacitors, the non-phosphate version failed completely. However, when the same phosphate was added to a conventional low voltage electrolyte containing ammonium adipate, water, and ethylene glycol formulated for 6 V service, the presence of the phosphate had a detrimental effect on electrical properties of the tested capacitors. Leakage currents for the non-phosphate vs phosphate version were 58 and 65 μA, respectively, initially. At 250 hrs the leakage current values were 230 vs 727 μA, and at 500 hrs the values were 362 vs 762 μA.

Thus, while the presence of phosphate is necessary for the electrolytes of the present invention, it is not beneficial to all adipate electrolytes. While ammonium dihydrogen phosphate has been used in the examples, other phosphate salts may be used providing they have sufficient solubility.

What is claimed is:

1. A high-temperature aluminum electrolytic capacitor comprising two aluminum electrode foils, with one of said foils bearing a barrier layer dielectric oxide, interleaved spacers wound throughout the length of said foils in contact with an electrolyte consisting essentially of ethylene glycol as solvent, water, a phosphate ion source, and as solute mono(di-n-propylammonium) adipate or mono(diisopropylammonium) adipate, thereby providing a capacitor capable of operating at 200 VDC or higher and at 130° C., said electrolyte having a room-temperature resistivity of at least 700 Ω-cm.

2. A capacitor according to claim 1 wherein said electrolyte contains 65.3 wt% glycol, 0.5 wt% phosphate, 2.4 wt% water, and 31.8 wt% mono(di-n-propylammonium) adipate and said resistivity is about 785 Ω-cm.

3. A capacitor according to claim 1 wherein said electrolyte contains 88.40 wt% glycol, 5.32 wt% water, 0.3 wt% ammonium dihydrogen phosphate, and 5.98 wt% mono(di-n-propylammonium) adipate and said resistivity is about 1540 Ω-cm.

4. A capacitor according to claim 1 wherein said electrolyte contains 75.97 wt% glycol, 3.99 wt% water, 0.5 wt% ammonium dihydrogen phosphate, and 19.84 wt% mono(diisopropylammonium) adipate and said resistivity is about 930 Ω-cm.

* * * * *